US006954779B2

(12) United States Patent
Duggan et al.

(10) Patent No.: US 6,954,779 B2
(45) Date of Patent: Oct. 11, 2005

(54) METHOD FOR PROVIDING PERFORMANCE DATA OF A WEB SERVER INDEPENDENT OF PLATFORM

(75) Inventors: Richard K. Duggan, Toronto (CA); Harm Sluiman, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 09/826,380

(22) Filed: Apr. 5, 2001

(65) Prior Publication Data

US 2002/0169860 A1 Nov. 14, 2002

(51) Int. Cl.[7] .............................................. G06F 15/16
(52) U.S. Cl. ...................... 709/203; 709/224; 709/246; 707/10; 714/47
(58) Field of Search ................................. 709/200–203, 709/217–219, 223–224, 225–226, 246; 707/10; 714/46–47, 20, 25, 57

(56) References Cited

U.S. PATENT DOCUMENTS

| 5,684,945 | A | * | 11/1997 | Chen et al. .................... 714/20 |
| 6,247,050 | B1 | * | 6/2001 | Tso et al. ..................... 709/224 |
| 6,301,615 | B1 | * | 10/2001 | Kutcher ....................... 709/224 |
| 6,381,635 | B1 | * | 4/2002 | Hoyer et al. ................. 709/207 |
| 6,646,660 | B1 | * | 11/2003 | Patty ........................... 700/108 |
| 6,677,858 | B1 | * | 1/2004 | Faris et al. .................. 709/203 |
| 6,691,067 | B1 | * | 2/2004 | Ding et al. .................. 709/224 |
| 6,691,259 | B1 | * | 2/2004 | Mackey et al. ............... 714/46 |
| 6,799,211 | B1 | * | 9/2004 | Bennett et al. .............. 709/224 |

* cited by examiner

*Primary Examiner*—Bharat Barot
(74) *Attorney, Agent, or Firm*—A. Bruce Clay; Hoffman, Warnick & D'Alessandro LLC

(57) ABSTRACT

A system and method for the publication of performance data over a network for access by a plurality of performance tools. In response to HTTP calls, the performance data is provided to performance tools over a network in XML data structures.

37 Claims, 14 Drawing Sheets

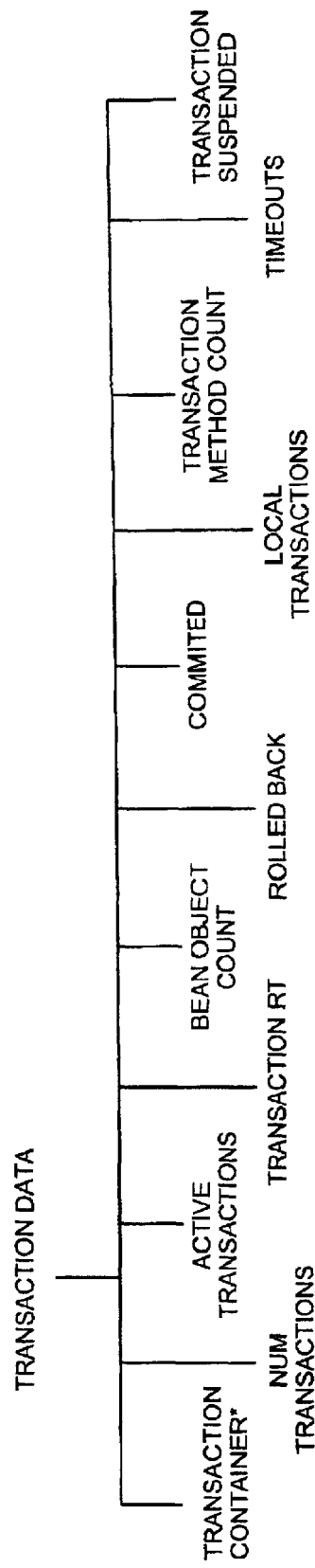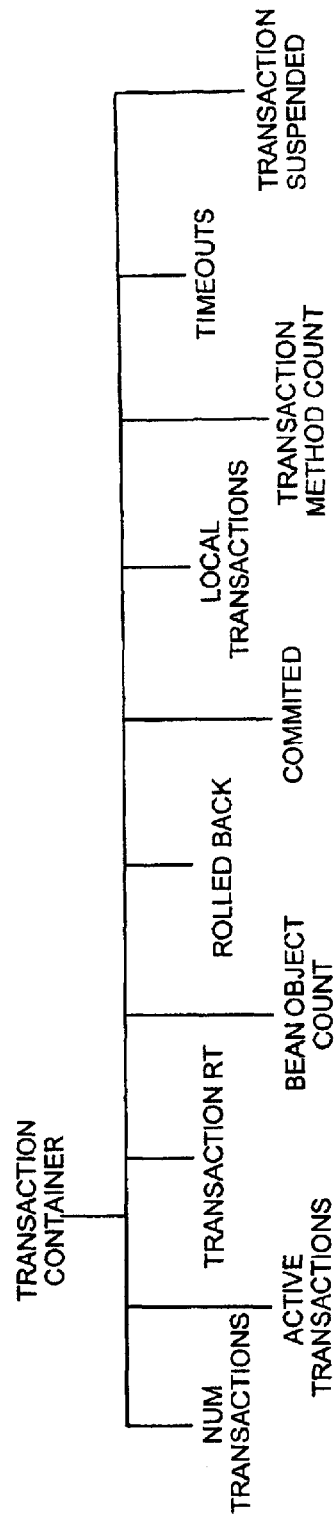

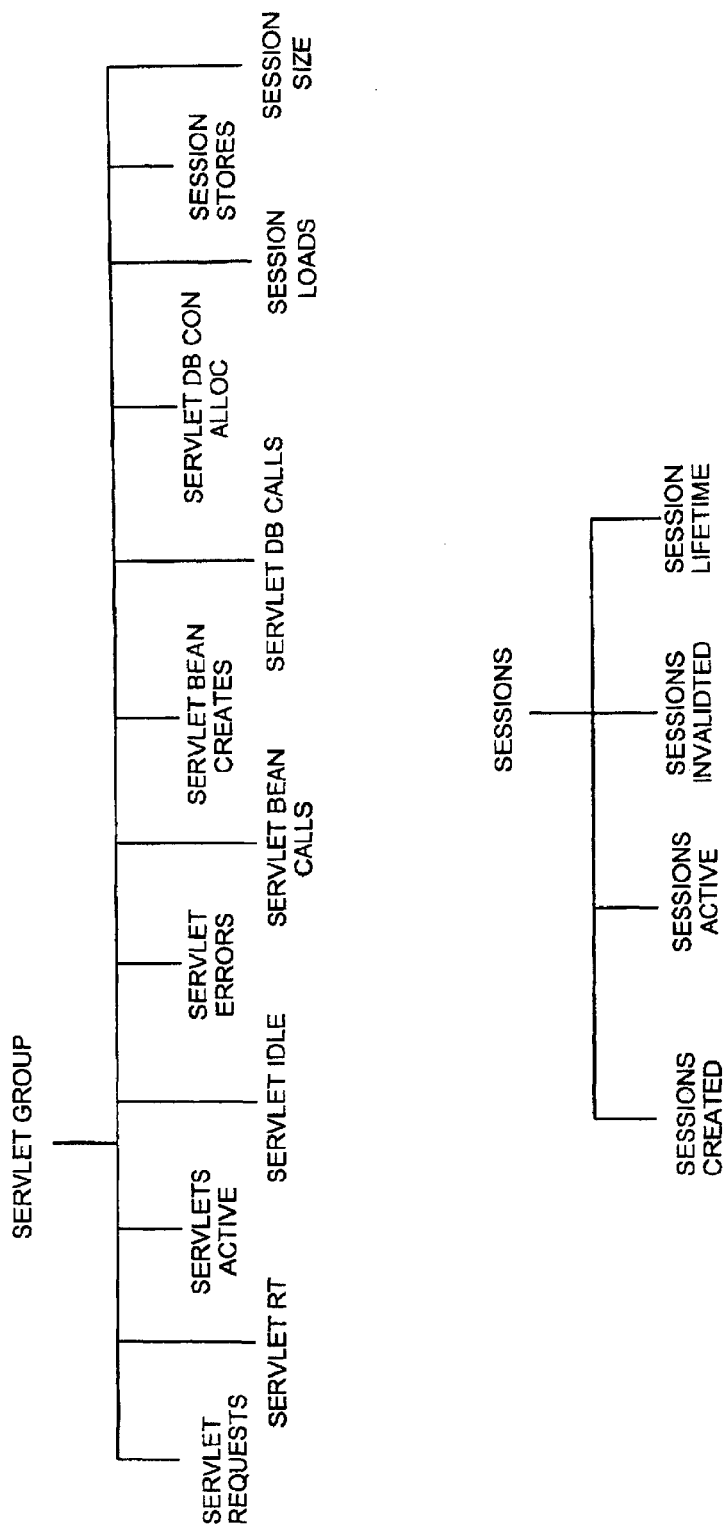

FIGURE 3M

BEAN CONTAINER*
└─ BEAN DATA
   (StatelessBeanInstantiates | EntityBeanInstantiates
   StatefulBeanInstantiates | StatefulBeanDestroys
   StatelessBeanDestroys | StatelessBeansLive
   EntityBeanDestroys | EntityBeansLive
   StatefulBeansLive | StatefulBeanCreates
   EntityBeanCreates | StatefulBeanRemoves
   EntityBeanRemoves | StatefulBeanPassivates
   EntityBeanPassivates | StatefulBeanActivates
   EntityBeanActivates | EntityBeansActive
   BeanLoads | BeanStores | BeanMethodRT
   StatefulBeansActive | BeanMethodActive)*
   BeanMethodCalls

FIGURE 4

```
<?XML version="1.0" encoding="UTF-8"?>
<!DOCTYPE PerformanceMonitor >
<PerformanceMonitor>
  <RuntimeResources>
    <MemoryFree>
      <PerfNumericInfo uid="epm4" time="225" val="12577511"/>
    </MemoryFree>
    <MemoryTotal>
      <PerfNumericInfo uid="epm5" time="225" val="16777207"/>
    </MemoryTotal>
    <MemoryUse>
      <PerfNumericInfo uid="epm6" time="225" val="4199696"/>
    </MemoryUse>
  </RuntimeResources>
         . . .
<Sessions>
    <SessionsCreated>
      <PerfNumericInfo uid="epm373" time="203" val="0"/>
    </SessionsCreated>
    <SessionsActive>
      <PerfNumericInfo uid="epm374" time="203" val="0.0"/>
    </SessionsActive>
    <SessionsInvalidated>
      <PerfNumericInfo uid="epm375" time="203" val="0"/>
    </SessionsInvalidated>
    <SessionLifetime>
      <PerfStatInfo uid="epm378" time="203" ss="0.0" obs="0"/>
    </SessionLifetime>
  </Sessions>
</PerformanceMonitor>
```

METHOD FOR PROVIDING PERFORMANCE DATA OF A WEB SERVER INDEPENDENT OF PLATFORM

FIELD OF INVENTION

This invention relates to monitoring the performance status of applications and in particular to a method for providing performance data of a web server.

BACKGROUND OF THE INVENTION

It is essential to monitor the performance status of applications once they are deployed and, in particular, where such applications are deployed over the Internet or the World-Wide Web ("Web") and where they must provide a certain quality of service. Prior art performance monitoring systems typically comprise three parts: collection, transport, and analysis. The collection part may further include a data filtering function to reduce the data collected. The performance data is typically collected into large files for later transport and analysis. An example of such a performance tool is revealed in U.S. Pat. No. 5,067,107 entitled "Continuous Computer Performance Measurement Tool That Reduces Operating System Produced Performance Data for Logging into Global, Process, and Workload Files".

These prior art performance monitoring systems have a number of disadvantages resulting from the use of propriety standards by various vendors. The disadvantages include a high cost for developing the transport and analysis parts for each new application to be monitored; and a lack of efficiency in that a monitoring system can not be used to monitor a number of different applications from different vendors and an application can not be monitored by a number of different monitoring systems from different vendors.

There is also a number of richly functioned existing monitoring systems that have already been deployed for monitoring of applications. However, it is costly to re-write the code of these monitoring systems in order to monitor each new application. It is therefore desirable to provide performance monitoring systems which addresses, in part, some of the shortcomings of existing monitoring systems noted above.

Performance data in this document refers to information that provides a snapshot or a quick scan of computing system or server activity, and includes such data as how much memory is being used and by which processes. Performance tools in this document refers to the analysis part of performance monitoring systems.

CLAIM TO COPYRIGHT

A portion of the disclosure of this patent document contains material, which is subject to copyright protection: ©2001 International Business Machines Corporation. The copyright owner has no objection to the facsimile reproduction by anyone of the patent document, as it appears in the Patent and Trademark Office patent file or records, but otherwise reserves all copyright rights whatsoever.

SUMMARY OF THE INVENTION

The present invention utilizes the existing Internet communication infrastructure for all communication functions so that performance tool vendors do not have to develop a communication system between performance tools and collection agents. This infrastructure provides a facility to transport collected performance data and to provide a standard interface between collection agents and performance tools. The existing Internet communication infrastructure uses a network protocol known as Transport Control Protocol using Internet Protocol or TCP/IP.

The present invention also specifies a data structure in XML format to provide a consistent format for transferring performance data from collection agents to performance tools. This consistency allows performance tools to be independent of applications being monitored so that, for example, performance tools of one vendor can monitor applications of another vendor.

According to an aspect of the invention, there is provided a method for a servlet of an Application server running on a Web server to provide performance data to a performance tool running on a client computer, where the Web server and the client computer are in communication over a network using a network protocol, said method comprising: receiving a request for performance data from the performance tool, where the request is transported over the network; obtaining the performance data as per the request; formatting the performance data into a data structure; and providing the data structure to the Web server for transport to the performance tool over the network.

According to another aspect of the invention, there is provided a monitoring system embedded within a computing system for providing performance data to a performance tool running on a client computer, where the computing system and the client computer are in communication over a network using a network protocol, comprising: a communication system to receive a request for performance data from the performance tool, where the request is transported over the network; a data collection system to obtain the performance data as per the request; and a processing system to format the performance data into a data structure; wherein the data structure is provided to the computing system for transport to the performance tool over the network.

According to another aspect of the invention, there is provided an article to provide performance data of a computing system to a performance tool running on a client computer, where the computing system and the client computer are in communication over a network using a network protocol, comprising: a computer-readable storage medium for the computing system; means recorded on the medium for the computing system to receive a request for performance data from the performance tool, where the request is transported over the network; means recorded on the medium to obtain the performance data as per the request; means recorded on the medium to format the performance data into a data structure; and means recorded on the medium to provide the data structure to the computing system for transport to the performance tool over the network.

According to another aspect of the invention, there is provided a method for a performance tool running on a client computer to retrieve performance data from a servlet of an Application server running on a Web server, where the Web server and the client computer are in communication over a network using a network protocol, said method comprising: sending a request for performance data to the servlet, where the request is provided to the client computer for transport over the network; and receiving a data structure containing the performance data transported from the servlet over the network to the client computer.

According to another aspect of the invention, there is provided a performance tool embedded within a client computer which retrieves performance data from a servlet of a computing system, where the computing system and the performance tool are in communication over a network using a network protocol, the improvement comprising: a processor to provide a request for performance data where the request is sent by the client computer to the computing system over the network; and to receive a data structure containing the performance data where the data structure is transported from the computing system to the client computer over the network.

According to another aspect of the invention, there is provided an article of a performance tool for running on a client computer to retrieve performance data from a servlet of a computing system, where the computing system and the performance tool are in communication over a network using a network protocol, comprising: a computer-readable storage medium; means recorded on the medium for providing a request for performance data to the client computer for transport to the computing system over the network; and means recorded on the medium for receiving a data structure containing the performance data transported from the computing system to the client computer over the network.

BRIEF DESCRIPTION OF THE DRAWINGS

In the accompanying drawings:

FIG. 4 is an XML document listing showing part of the start and the end of an exemplary snapshot of performance data in an XML document in accordance with the specification as shown in FIG. 3.

DETAILED DESCRIPTION OF THE PREFERRED EMBODIMENTS

By divorcing the collection and transport functions from the analysis function, the disadvantages of the prior art can be reduced. The "publication" of performance data for analysis by performance tools of a number of difference vendors is advantageous. The inventors have realized that it would be possible to create performance tools, which are independent of the applications being monitored. Further, the code of existing monitor systems only needs to be re-written once to monitor all applications which provide such "publication" of performance data.

A Web server is an application, or may be a set of applications, running in an operating system providing web services to access the Internet. The Web server can run and control sub-processes independent of the operating system. An Application server is one of the sub-processes that the Web server can run. The Application server in turn can also run and control sub-processes called servlets ("servlets"). Alternatively, a Web server may also run servlets.

Application servers can provide their performance data to their sub-processes, such as servlets, through an application program interface ("API") via middleware. Middleware is a part of Application servers. A servlet may poke their Application server to obtain performance data of the Application server. Other known means of obtaining performance data from applications being monitored are also available. A Web server may also provide performance data on its processes for a snapshot of its activities.

Figure 1:
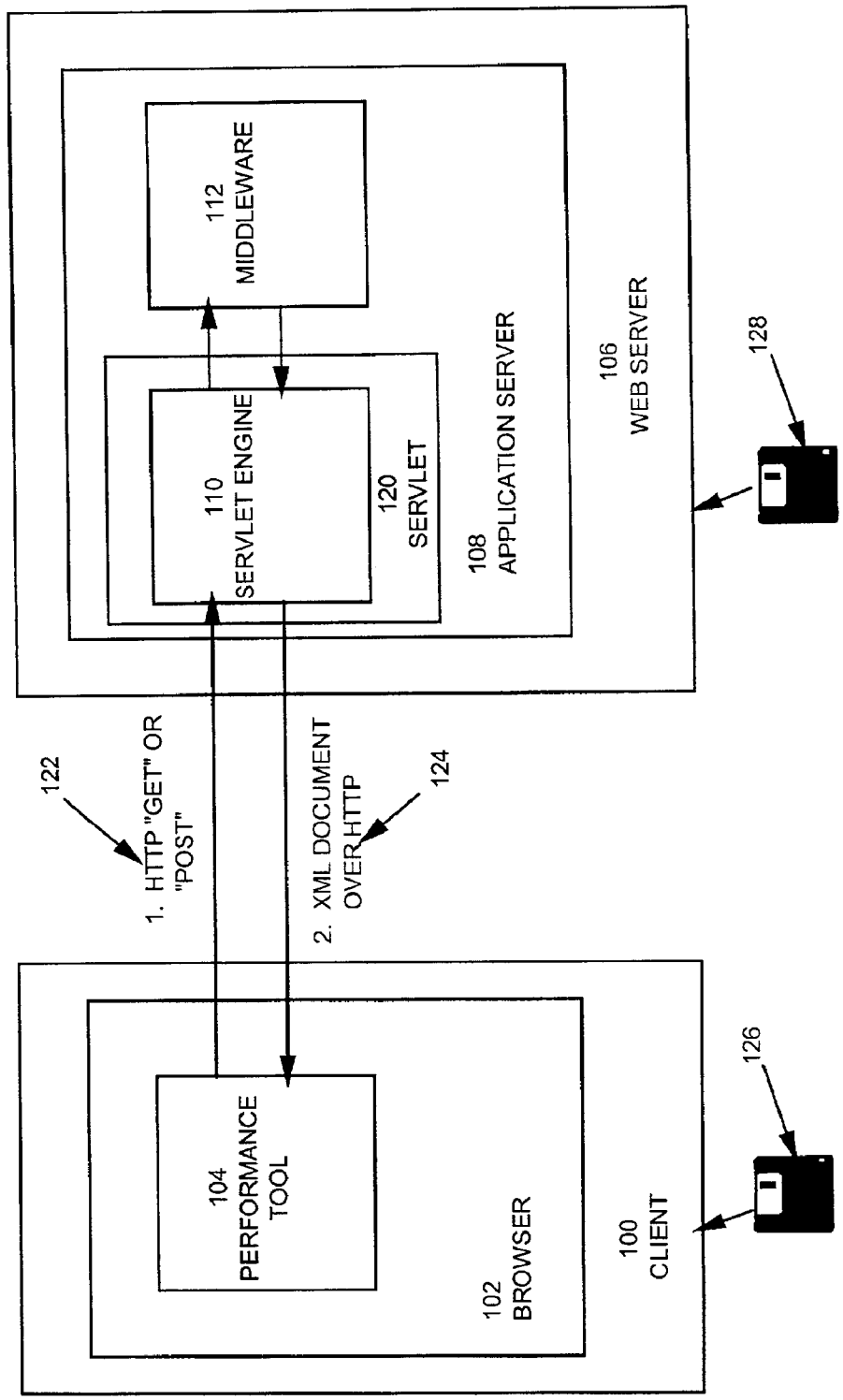
FIG. 1 is a block diagram of a performance monitoring system in accordance with one embodiment of the present invention.

Referring to the drawings and initially to FIG. 1, there is illustrated an overview of a performance monitoring system in accordance with one embodiment of the present invention. The performance monitoring system comprising a client computer 100 having a browser 102 that runs a Java application and a performance tool 104; and a Web server 106 having an Application server 108 that runs a servlet 110, which obtains performance data on the Application server 108 from middleware 112. The client computer 100 and the Web server 106 communicate over the Internet using the standard TCP/IP network protocol.

The performance tool 104 issues a Hypertext Transfer Protocol ("HTTP") "Get" or "Post" request 122 for a snapshot of performance data from the Application server 108. The request 122 asks the Application server 108 for a web page file. The address of the file is provided as a part of the request 122. In response to the request 122 for the web page file, the Application server 108 invokes the servlet 110 and creates an HTTP Response Object for the servlet 110 to respond with an Extensible Markup Language ("XML") document 124 containing the performance data. The XML document 124 is then returned to the browser 102. The Application server 108 has a servlet engine 120 that runs the servlet 110.

For each request 122, the servlet 110 obtains a set of performance data from the Application server 108 and formats the data in a data structure for the XML document 124. The XML document 124 is written to the HTTP Response Object for sending to the browser 102. The HTTP Response Object is transported to the client computer 100 via communication services provided by the Web server 106. The performance data is thus received for rendering and analysis by the performance tool 104.

The servlet 110 is configured to obtain and provide all of the available performance data of the Application server 108. However, it will be understood by one skilled in the art that there may be a number of different servlets to provide different sets of performance data on the Application server 108. A servlet at one file address may be invoked to provide a sub-set of performance data, while another servlet at another file address, if invoked, may provide a different sub-set of performance data.

The existing Internet communication infrastructure is utilized for communications between the client computer 100 and the Web server 106. Routine communication matters, such as capturing the address of the browser 102 by the socket layer of the Web server 106, are part of this infrastructure. By leveraging the existing Internet communication infrastructure, the code of the servlet 110 is relative simple and compact as the transport aspects are limited to receiving the HTTP Request Object and providing an XML document to the HTTP Response Object for transport.

A capture of an exemplary HTTP "GET" for a servlet as invoked from an Internet Explorer 5.0 Web Browser™ is as follows:

GET/PerformanceApp/servlet/
   com.ibm.ivb.epm.servlet.PerformanceServlet HTTP/
   1.1
Accept: image/gif, image/x-xbitmap, image/jpeg, image/
   pjpeg, application/msword, application/vnd.ms-
   powerpoint, */*
Accept-Language: en-us
Accept-Encoding: gzip, deflate User-Agent: Mozilla/4.0 (compatible; MSIE 5.01; Windows NT; 3Com U.S. Robotics Connections)
Host: rduggan:8080
Connection: Keep-Alive The performance tool 104 is preferably implemented in the browser 102 as a Java applet, but other techniques such as Extensible Style Language style sheets can also be used for rendering the data. The existing browser rendering and communication functions are also leveraged so that these functions do not have to be developed by the performance tool vendors, thereby reducing the cost of development. These vendors can instead concentrate on developing code for analyzing performance data. One or more different performance tools can, of course, concurrently request performance data from servlets of an Application server for different purposes.

Figure 2:
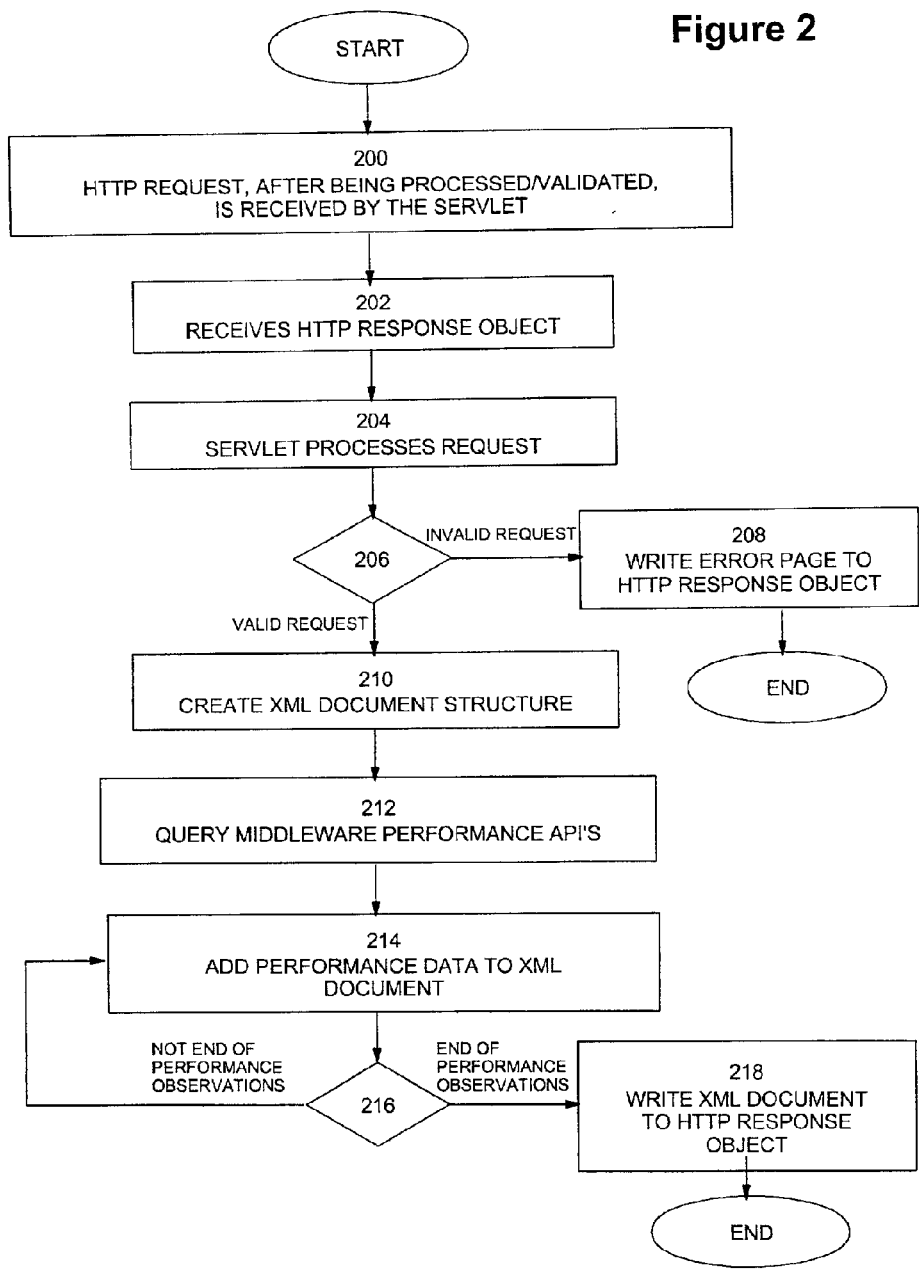
FIG. 2 is a flowchart outlining the steps for processing a request by a servlet in accordance with the embodiment as shown in FIG. 1.

Referring to FIG. 2, there is a flowchart outlining the steps for processing an HTTP Request 122 by the servlet 110 in accordance with FIG. 1 of the present invention. Upon receiving and validating (step 200) the HTTP request 122, the Web server 106 initiates execution of (invokes) the servlet 110 if it is not already running and creates an HTTP Response Object (step 202). The servlet 110 receives the HTTP Request 122 and the HTTP Response Object. The servlet 110 processes the request 122 (i.e. parses the request); (step 204) and determines whether the request is valid or invalid (step 206). If the request is invalid then an error page is written to the HTTP Response Object for transport to the performance tool 104 (step 208) and the execution of the servlet ends.

If the HTTP Request 122 is valid then a servlet data structure is created in XML format. Specifically, an XML document 124 is created (step 210) and the API of middleware 112 is queried for performance data (step 212) of the Application server 108. Middleware 112 returns performance data to the servlet 110, but the data is in a middleware data structure. The servlet 110 then maps the data in the middleware data structure into the servlet data structure (step 214). This mapping is well understood by one skilled in the art.

The obtained performance data is further stored in the servlet data structure (step 214) as the data is received by the servlet 110. The servlet 110 then determines if observations of performance data have ended (step 216). If the observations have not ended then step 214 continues until the observations have ended. The data structure is then written to the HTTP Response Object (step 208) for transport by the Web server 106 to the requesting performance tool. The XML document 124 of the HTTP Response Object is streamed to the client computer 100.

The XML document 124 created at step 210 is a text file. The requesting performance tool receives the XML document 124 as a string of text. The text is then parsed to extract the performance data. Consequently, the servlet 110 provides performance data in a consistent data structure, which can then be parsed by a number of performance tools from different vendors. Further, by using the servlets to provide performance data, the API for obtaining the performance data from monitored applications may be changed as well as the data structure of the performance data as provided from these applications. The servlets can then re-written to account for these changes, but the data structure of the performance data remains the same for parsing and extraction by performance tools.

Specification

Figure 3A:
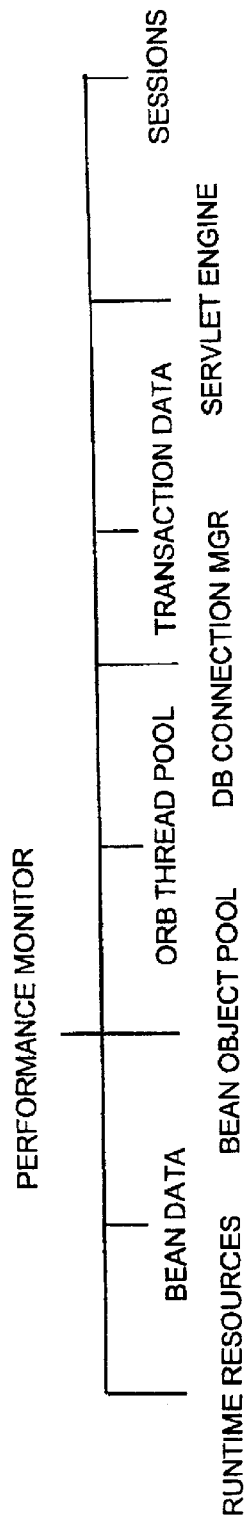
FIGS. 3a to 3s are tree diagrams illustrating a specification of the data structure of performance data for the servlet in accordance with the embodiment as shown in FIG. 1.
Figure 3B:
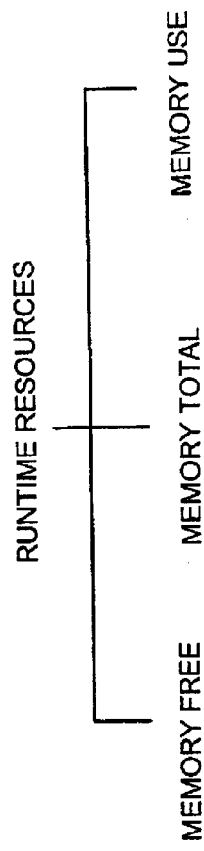
Figure 3C:
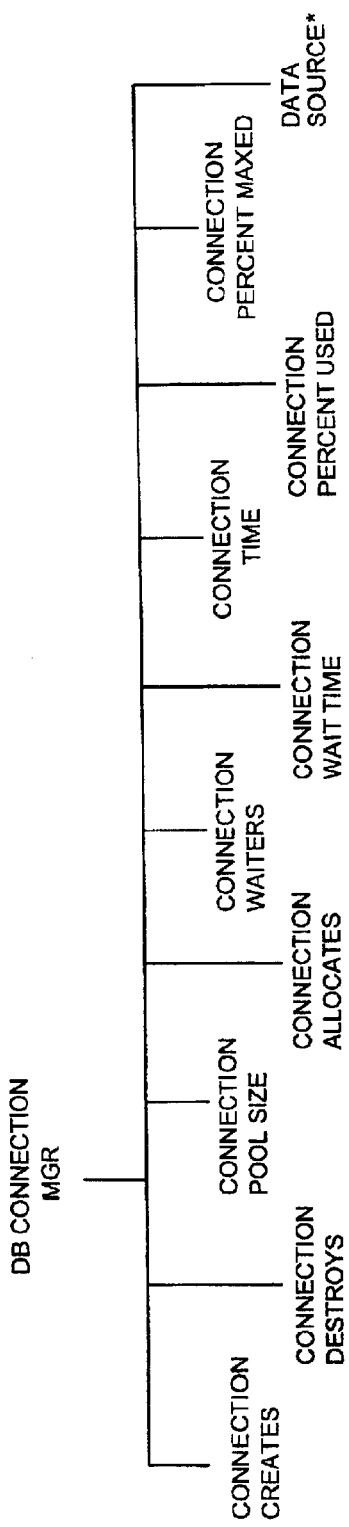
Figure 3D:
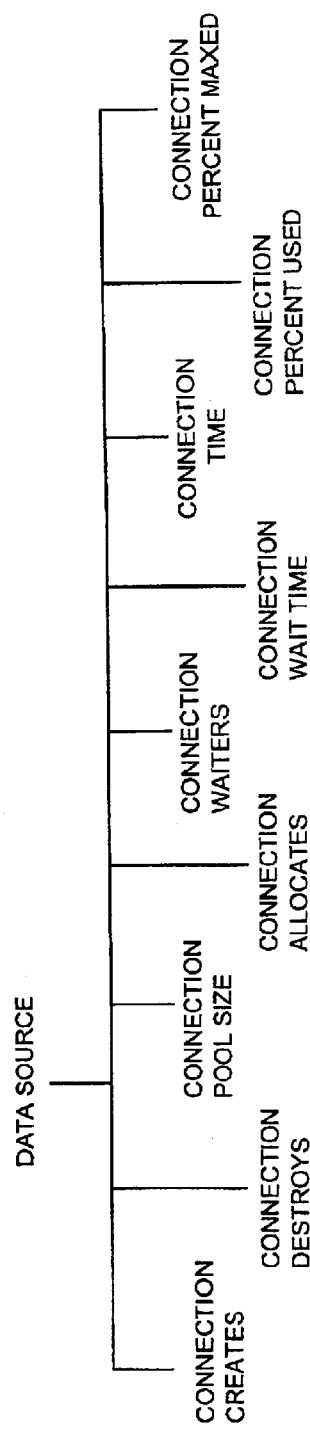
Figure 3G:
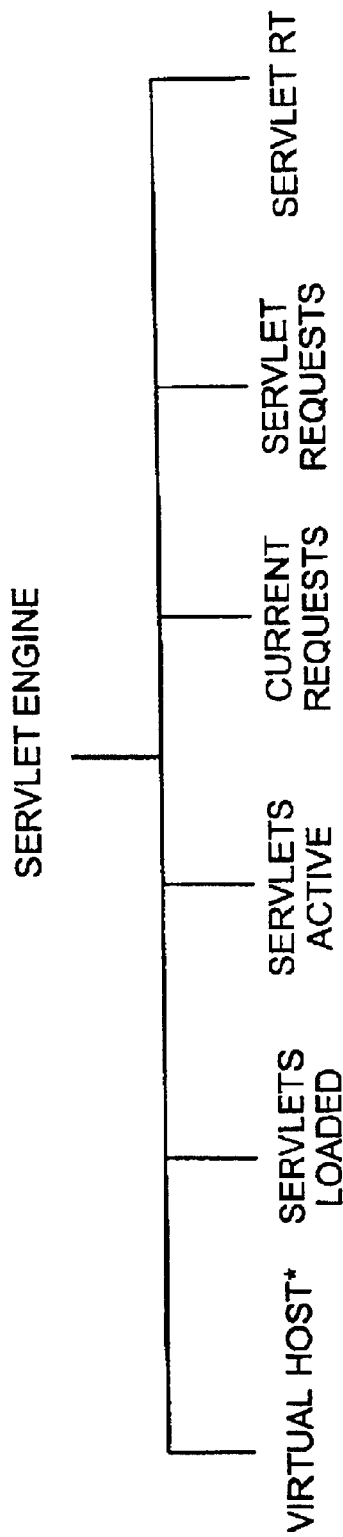
Figure 3H:
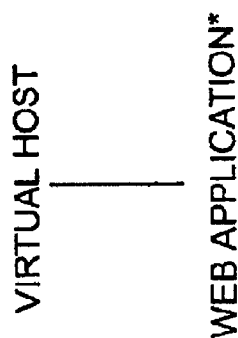
Figure 3I:
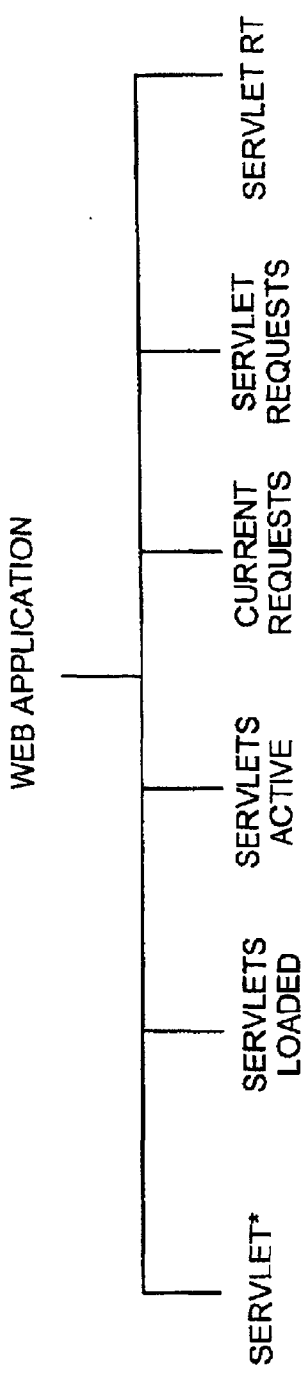
Figure 3J:
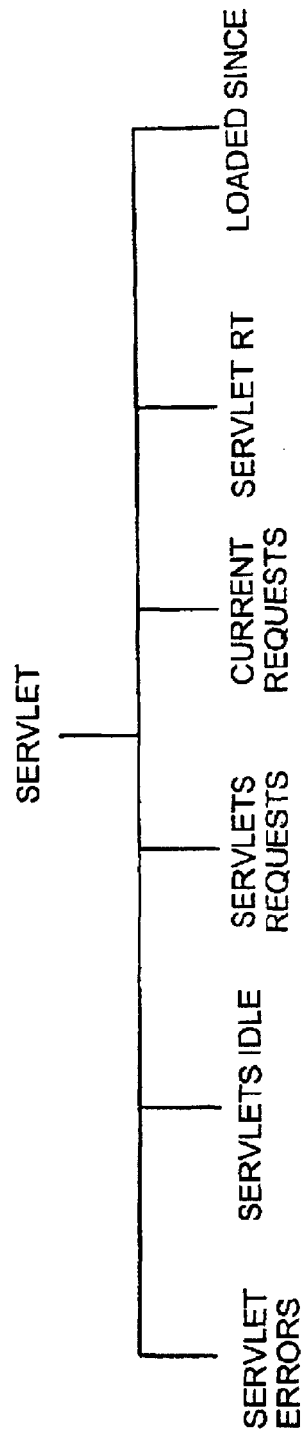
Figure 3N:
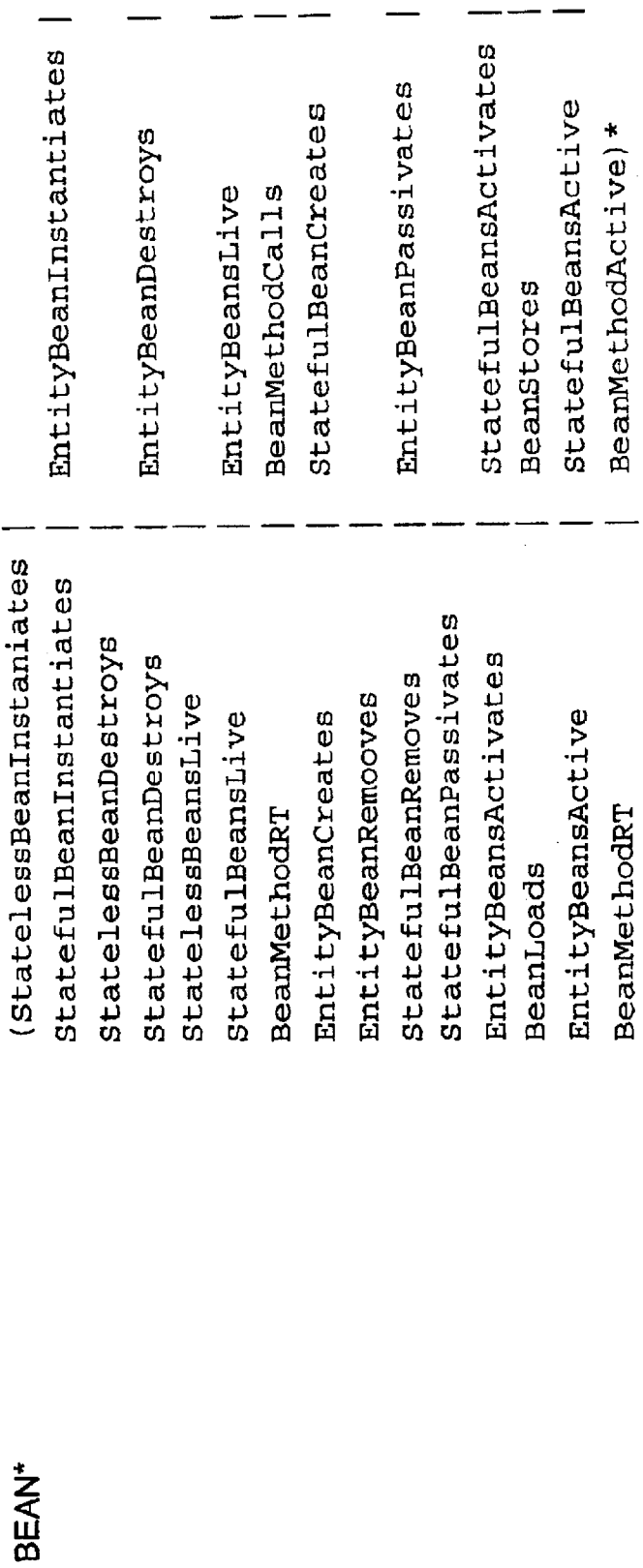
Figure 3O:
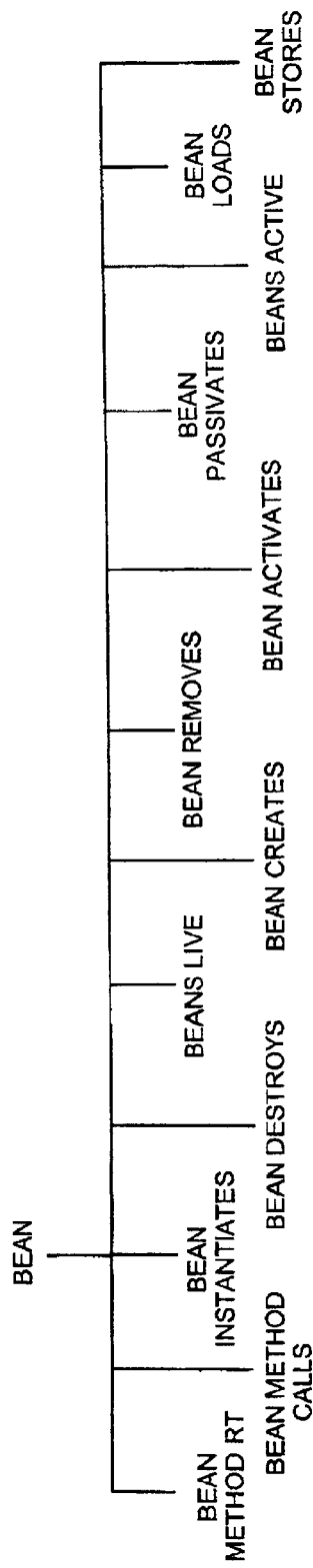
Figure 3P:
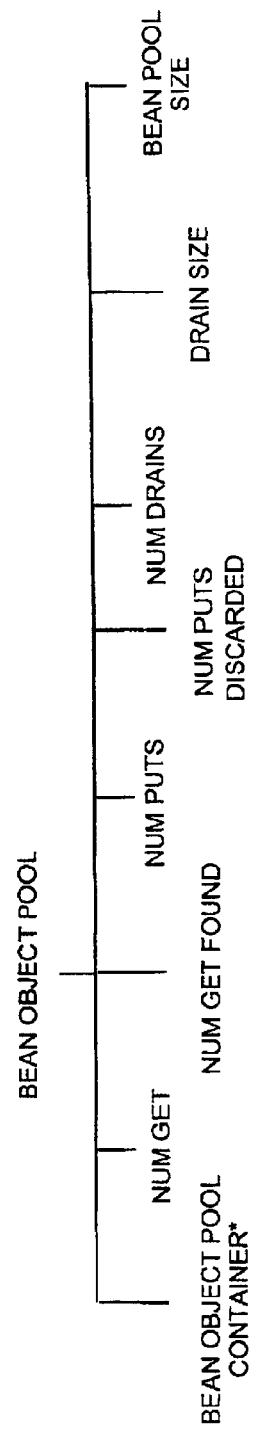
Figure 3Q:
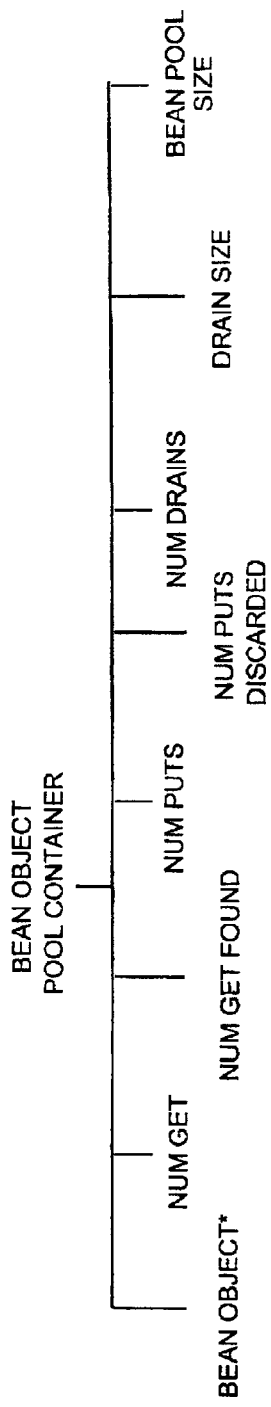
Figure 3R:
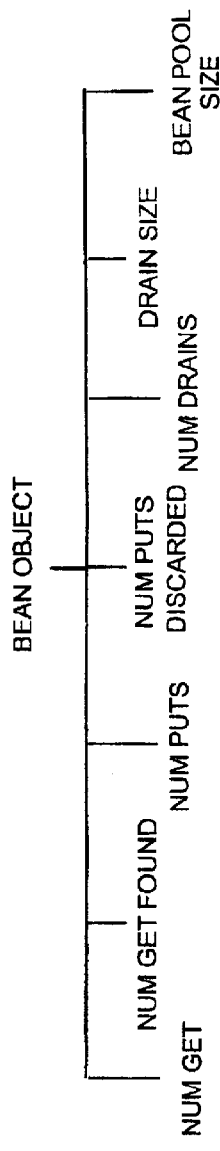
Figure 3S:
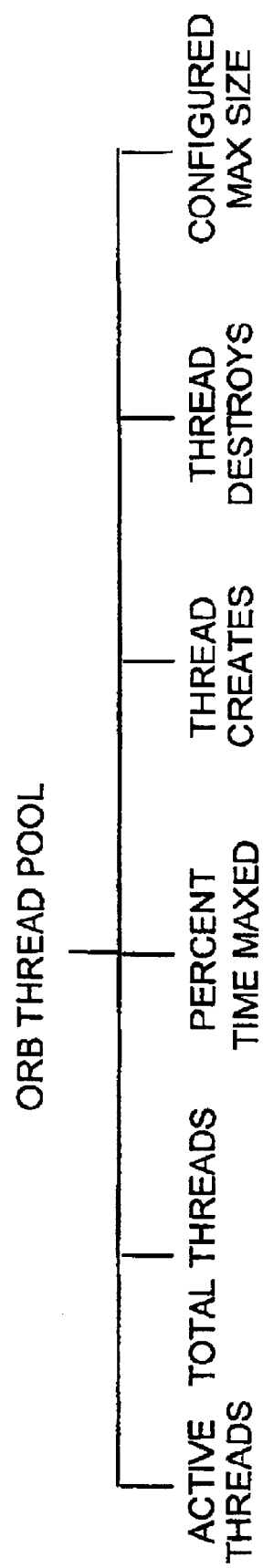

FIGS. 3a to 3s illustrate a specification of the data structure of performance data for the servlet 110 in accordance as shown in FIG. 1. The data structure describes a performance snapshot of the state of the Application server 108. The data structure has a tree topology starting with a root and ending at the leaves where each branch defines a specific set of data and where the leaves indicate specific values. For the most part, the elements of the data structure are described in Document Type Definition (DTD) format below Referring to FIG. 4, an example is shown of part of the start and the end of a snapshot of performance data represented in an XML document. The initial <?XML version="1.0" encoding="UTF-8"?> text is the standard tag for identifying the string as an XML document. The <!DOCTYPE PerformanceMonitor> text is the name of the XML document containing performance data. The performance data starts after <PerformanceMonitor> text (i.e. the root) and ends with <PerformanceMonitor> text.

Returning to FIG. 3a; the root, PerformanceMonitor, and the main branches (RuntimeResources, BeanData, BeanObjectPool, OrbThreadPool, DBConnectionMgr, TransactionData, ServletEngine, Sessions) are shown. In DTD format, this is described as

```
<!-- The document root -->
<!ELEMENT PerformanceMonitor (RuntimeResources?, BeanData?,
BeanObjectPool?, OrbThreadPool?, DBConnectionMgr?,
TransactionData?, ServletEngine?, Sessions?)>
<!ATTLIST PerformanceMonitor
    serverId ID #IMPLIED>.
```

This specification of the data structure uses "*" to mean zero, one, or more than one element or collection point sample; and "?" to mean optional. A description of each of the elements is indicated above the "<!ELEMENT" in a paragraph or in point form following "<!--". The main branches are optional which means that if performance data is available then the data is presented according to this specification, and that if the performance data is not available then it is not presented. For example, if there are no servlets running then performance data on the servlet engine is not available to be presented.

The <!ATTLIST PerformanceMonitor text is the header to the list of attributes for the element, PerformanceMonitor. The attribute serverId ID #IMPLIED text indicates that the root optionally has an identification to distinguish performance data of one Application server from that of another. Where a serverId is not provided, the performance data as presented applies to only one implied Application server. Where more than one set of performance data is being provided, an exemplary root starts with <PerformanceMonitor serverId="tango.tango"> text and ends with </PerformanceMonitor> text. Each of the main branches is optional with each performance data snapshot.

Where "# IMPLIED" is used, the preceding data is optional and does not have to be present in the element as the data is implied. Conversely, "# REQUIRED" indicates that the preceding data is required and has to be present in the element.

The specification of the data structure has the following entity declarations: % PerfObject, % PerfInfo, % StatInfo, % RateInfo, PerfNumericInfo, PerfLoadInfo, and PerfStatInfo. The entity declarations are short forms or macros of certain definitions. Each collection of performance data contains a type, PerfObject, and a collection of performance samples, PerfInfo. All PerfObject types contain a name attribute for identifying the object. The % PerfObject entity is represented in DTD format as follows:

```
<!ENTITY % PerfObject "name CDATA #IMPLIED">
```

Each collection of performance data samples contains, as a minimum: uid, time, and val. The "uid" uniquely identifies the PerfInfo, performance samples, within the scope of the entire performance collection. The "time" indicates when the data was collected on the Application server. The "val" is the value of the collection point. The % PerfInfo entity is represented in DTD format as follows:

```
<!ENTITY % PerfInfo "uid ID #IMPLIED
        time CDATA #REQUIRED
        val CDATA #IMPLIED">
```

The % StatInfo entity is a specialized % PerfInfo for statistical data points where "ss" denotes the sum of the squares of the variance of each data point about the mean; and "obs" denotes the count of the number of observations in the history. The % StatInfo entity is represented in DTD format as follows:

```
<!ENTITY % StatInfo  "ss   CDATA #IMPLIED
          obs CDATA #IMPLIED">
```

The % RateInfo entity is a specialized PerfInfo for a rate of change since the last observation. The % RateInfo entity is represented in DTD format as follows:

```
<!ENTITY % RateInfo "rate CDATA #IMPLIED">
```

The element, PerfNumericInfo, is a combination of % PerfInfo and % RateInfo entity. The, EMPTY" means that there are no children. The element, PerfNumericInfo, is represented in DTD format as follows:

```
<!ELEMENT PerfNumericInfo EMPTY>
<!ATTLIST PerfNumericInfo
        %PerfInfo;
        %RateInfo;>
```

The element, PerfLoadInfo, is a PerfInfo observation containing a load value and optionally also a delta value (changed value). The element, PerfLoadInfo, is represented in DTD format as follows:

```
<!ELEMENT PerfLoadInfo EMPTY>
<!ATTLIST PerfLoadInfo
        %PerfInfo;>
```

The element, PerfStatInfo, is a PerfInfo observation containing statistical data. The element, PerfStatInfo, is represented in DTD format as follows:

```
<!ELEMENT PerfStatInfo EMPTY>
<!ATTLIST PerfStatInfo
        %PerfInfo;
        %StatInfo;>
```

The elements of the specification are further detailed below with reference to FIGS. 3b to 3s:

FIG. 3b shows an element, RuntimeResources, and its child elements, MemoryFree, MemoryTotal, and MemoryUse, which indicate the resources related to the JVM (Java Virtual Machine) runtime as well as the ORB (Object Request Broker). In DTD format, this is represented by:

```
<!ELEMENT RuntimeResources (MemoryFree, MemoryTotal,
MemoryUse)>
<!ATTLIST RuntimeResources
        %PerfObject;>
<!-- The total memory allocated for the JVM
-->
<!ELEMENT MemoryTotal (PerfNumericInfo)*>
<!ATTLIST MemoryTotal
        %PerfObject;>
<!-- Amount of free memory that is remaining in the JVM
-->
<!ELEMENT MemoryFree (PerfNumericInfo)*>
<!ATTLIST MemoryFree
        %PerfObject;>
<!-- The total memory in use within the JVM.
-->
<!ELEMENT MemoryUse (PerfNumericInfo)*>
<!ATTLIST MemoryUse
        %PerfObject;>
```

FIG. 3c shows an element, DBConnectionMgr, and its child elements, which indicate the resources related to a database connection manager of a JVM. This manager element consists of a series of identifications for data sources as well as a top level aggregate of each of the performance metrics. The DBConnectionMgr element is optional and is not present if the manager is not running. In DTD format, this is represented by:

```
<!ELEMENT DBConnectionMgr (ConnectionCreates,
ConnectionDestroys, ConnectionPoolSize, ConnectionAllocates,
ConnectionWaiters, ConnectionWaitTime, ConnectionTime,
ConnectionPercentUsed,
ConnectionPercentMaxed, DataSource*)?>
<!ATTLIST DBConnectionMgr
        %PerfObject;>
```

FIG. 3d shows an element, DataSource, and its child elements, which indicate the resources related to a specific data source specified by the "name" attribute of % PerfObject. In DTD format, this is represented by:

```
<!ELEMENT DataSource (ConnectionCreates, ConnectionDestroys,
ConnectionPoolSize, ConnectionAllocates, ConnectionWaiters,
ConnectionWaitTime, ConnectionTime, ConnectionPercentUsed,
ConnectionPercentMaxed)>
<!ATTLIST DataSource
        %PerfObject;>
<!-- Number of connections created.
-->
<!ELEMENT ConnectionCreates (PerfNumericInfo)*>
<!ATTLIST ConnectionCreates
        %PerfObject;>
<!-- Number of connections released
-->
<!ELEMENT ConnectionDestroys (PerfNumericInfo)*>
<!ATTLLST ConnectionDestroys
        %PerfObject;>
<!-- Average size of the pool, i.e. number of connections.
-->
<!ELEMENT ConnectionPoolSize (PerfLoadInfo)*>
<!ATTLIST ConnectionPoolSize
        %PerfObject;>
<!-- Number of times a connection was allocated
```

```
-->
<!ELEMENT ConnectionAllocates (PerfNumericInfo)*>
<!ATTLIST ConnectionAllocates
    %PerfObject;>
<!-- Average number of threads waiting for a connection
-->
<!ELEMENT ConnectionWaiters (PerfLoadInfo)*>
<!ATTLIST ConnectionWaiters
    %PerfObject;>
<!-- Average time, in seconds, of a connection grant
-->
<!ELEMENT ConnectionWaitTime (PerfStatInfo)*>
<!ATTLIST ConnectionWaitTime
    %PerfObject;>
<!-- Average time, in seconds that a connection is in use
-->
<!ELEMENT ConnectionTime (PerfStatInfo)*>
<ATTLIST ConnectionTime
    %PerfObject;>
<!-- Average percentage of the pool that is in use
-->
<!ELEMENT ConnectionPercentUsed (PerfLoadInfo)*>
<!ATTLIST ConnectionPercentUsed
    %PerfObject;>
<!-- Percentage of the time that all connections are in use
-->
<!ELEMENT ConnectionPercentMaxed (PerfLoadInfo)*>
<!ATTLIST ConnectionPercentMaxed
    %PerfObject;>
```

FIG. 3e shows an element, TransactionData, and its child elements, which indicate the resources pertaining to transactions. The transactions are further divided into containers as indicated by an element, TransactionContainer. As denoted by "*", a single set of transaction data is indicated by the element, TransactionData, without the element, TransactionContainer. The element, TransactionContainer, is used to distinguish one or more sets of transaction data. In DTD format, this is represented by:

```
<!ELEMENT TransactionData (TransactionContainer*, NumTransactions,
ActiveTransactions, TransactionRT, BeanObjectCount, RolledBack,
Commited, LocalTransactions, TransactionMethodCount, Timeouts,
TransactionSuspended)?>
<!ATTLIST TransactionData
    %PerfObject;>
```

FIG. 3f shows the element, TransactionContainer, and its child elements, which indicate the resources that pertain to a single set of transactions. In DTD format, this is represented by:

```
<!ELEMENT TransactionContainer (NumTransactions,
ActiveTransactions, TransactionRT, BeanObjectCount,
RolledBack, Commited, LocalTransactions, TransactionMethodCount,
Timeouts, TransactionSuspended)>
<!ATTLIST TransactionContainer
    %PerfObject;>
<!-- Number of transactions processed
-->
<!ELEMENT NumTransactions (PerfNumericInfo)*>
<!ATTLIST NumTransactions
    %PerfObject;>
<!-- Average number of active transactions.
-->
<!ELEMENT ActiveTransactions (PerfLoadInfo)*>
<ATTLIST ActiveTransactions
    %PerfObject;>
<!-- Average Duration of each transaction
-->
<!ELEMENT TransactionRT (PerfStatInfo)*>
<!ATTLIST TransactionRT
    %PerfObject;>
<!-- Average number of bean object pools involved in a transaction
-->
<!ELEMENT BeanObjectCount (PerfLoadInfo)*>
<!ATTLIST BeanObjectCount
    %PerfObject;>
<!-- Number of transactions rolled back
-->
<!ELEMENT RolledBack (PerfNumericInfo)*>
<!ATTLIST RolledBack
    %PerfObject;>
<!-- Number of transactions committed
-->
<ELEMENT Commited (PerfNumericInfo)*>
<!ATTLIST Commited
    %PerfObject;>
<!-- Number of transactions that were local
-->
<!ELEMENT LocalTransactions (PerfNumericInfo)*>
<!ATTLIST LocalTransactions
    %PerfObject;>
<!-- Average number of methods invoked as part of each transaction
-->
<!ELEMENT TransactionMethodCount (PerfLoadInfo)*>
<!ATTLIST TransactionMethodCount
    %PerfObject;>
<!-- Number of transactions that timed out due to inactivity timeouts.
-->
<!ELEMENT Timeouts (PerfNumericInfo)*>
<!ATTLIST Timeouts
    %PerfObject;>
<!-- Average number of times that a transaction was suspended
-->
<!ELEMENT TransactionSuspended (PerfLoadInfo)*>
<!ATTLIST TransactionSuspended
    %PerfObject;>
```

FIG. 3g shows an element ServletEngine and its child elements, which indicate the resources that are related to servlets and JSP's (JavaServer Pages). The element ServletEngine is optionally divided to child elements VirtualHost then WebApplication then Servlet to indicate the resources with particularity. In DTD format, this is represented by:

```
<!ELEMENT ServletEngine (VirtualHost*, ServletsLoaded,
ServletsActive, CurrentRequests, ServletRequests, ServletRT)>
<!ATTLIST ServletEngine
    %PerfObject;>
```

FIG. 3h shows the element, VirtualHost, and its child element, WebApplication. In DTD format, this is represented by:

```
<!ELEMENT VirtualHost (WebApplication*)>
<!ATTLIST VirtualHost
    name CDATA #REQUIRED>
```

FIG. 3i shows the element, WebApplication, and its child elements. In DTD format, this is represented by:

```
<!ELEMENT WebApplication (Servlet*, ServletGroup*, ServletsLoaded,
ServletsActive, CurrentRequests?, ServletRequests?, ServletRT?)>
<!ATTLIST WebApplication
    name CDATA #REQUIRED>
```

FIG. 3j shows the element, Servlet, and its child elements. In DTD format, this is represented by:

```
<!ELEMENT Servlet (ServletErrors, ServletIdle, ServletRequests,
CurrentRequests, ServletRT, LoadedSince)>
<!ATTLIST Servlet
    name CDATA #REQUIRED>
```

FIG. 3k shows the element, Servlet, and its child elements. In DTD format, this is represented by:

```
<!ELEMENT ServletGroup (ServletRequests, ServletRT, ServletsActive,
ServletIdle, ServletErrors, ServletBeanCalls, ServletBeanCreates,
ServletDBCalls, ServletDBConAlloc, SessionLoads, SessionStores,
SessionSize)>
<!ATTLIST SerletGroup
    %PerfObject;>
<!--The number of servlets currently loaded.
-->
<!ELEMENT ServletsLoaded (PerfNumericInfo)*>
<!ATTLIST ServletsLoaded
    %PerfObject;>
<!--The number of requests serviced.
-->
<!ELEMENT ServletRequests (PerfNumericInfo)*>
<!ATTLIST ServletRequests
    %PerfObject;>
<!--The number of requests currently being serviced.
-->
<!ELEMENT CurrentRequests (PerfLoadInfo)*>
<!ATTLIST CurrentRequests
    %PerfObject;>
<!--The average response time for each request.
-->
<!ELEMENT ServletRT (PerfStatInfo)*>
<!ATTLIST ServletRT
    %PerfObject;>
<!--Average number of servlets actively processing requests.
-->
<!ELEMENT ServletsActive (PerfNumericInfo)*>
<!ATTLIST ServletsActive
    %PerfObject;>
<!--Amount of time that the server has been idle (i.e. time since last
request).
-->
<!ELEMENT ServletIdle (PerfNumericInfo)*>
<!ATTLIST ServletIdle
    %PerfObject;>
<!--Number of requests that resulted in an error or an exception.
-->
<!ELEMENT ServletErrors (PerfNumericInfo)*>
<!ATTLIST ServletErrors
    %PerfObject;>
<!--Number of beans method invocations were made by the servlet.
-->
<!ELEMENT ServletBeanCalls (PerfNumericInfo)*>
<!ATTLIST ServletBeanCalls
    %PerfObject;>
<!--Number of bean references were made by the servlet
-->
<!ELEMENT ServletBeanCreates (PerfNumericInfo)*>
<!ATTLIST ServletBeanCreates
    %PerfObject;>
<!--Number of database calls made by the servlet.
-->
<!ELEMENT ServletDBCalls (PerfNumericInfo)*>
<!ATTLIST ServletDBCalls
    %PerfObject;>
<!--Number of database connections allocated by the servlet.
-->
<!ELEMENT ServletDBConAlloc (PerfNumericInfo)*>
<!ATTLIST ServletDBConAlloc
%PerfObject;>
<!--Number of times the servlet session data was read from the database.
-->
<!ELEMENT SessionLoads (PerfNumericInfo)*>
<!ATTLIST SessionLoads
    %PerfObject;>
<!--Number of times the servlet session data was stored to the database.
-->
<!ELEMENT SessionStores (PerfNumericInfo)*>
<!ATTLIST SessionStores
    %PerfObject;>
<!--Average size, in bytes, of a session data.
-->
<!ELEMENT SessionSize (PerfLoadInfo)*>
<!ATTLIST SessionSize
    %PerfObject;>
<!--When the server was loaded (Uniform Naming Convention time)
-->
<!ELEMENT LoadedSince (PerfNumericInfo)*>
<!ATTLIST LoadedSince
    %PerfObject;>
```

FIG. 3l shows an element Sessions and its child elements, which indicate general performance metrics regarding the HTTP session pool. In DTD format, this is represented by:

```
<!ELEMENT Sessions (SessionsCreated, SessionsActive,
SessionsInvalidated?, SessionLifetime)>
<!ATTLIST Sessions
    %PerfObject;>
<!--The number of sessions created on the server.
-->
<!ELEMENT SessionsCreated (PerfNumericInfo)*>
<!ATTLIST SessionsCreated
    %PerfObject;>
<!--The number of currently active sessions
-->
<!ELEMENT SessionsActive (PerfNumericInfo)*>
<!ATTLIST SessionsActive
    %PerfObject;>
<!--The number of invalidated sessions.
-->
<!ELEMENT SessionsInvalidated (PerfNumericInfo)*>
<!ATTLIST SessionsInvalidated
    %PerfObject;>
<!--This element contains statistical data of sessions that have been
invalidated, but does not include sessions that are still alive.
-->
<!ELEMENT SessionLifetime (PerfStatInfo)*>
<!ATTLIST SessionLifetime
    %PerfObject;>
```

Performance data on a container is dependent on the type of bean that is deployed in the container. The top level bean data holds an aggregate of all the containers. Each "|" means "or". The element, BeanData, has a number of "or" child elements, because the order the aggregates to be discovered is uncertain. FIG. 3m shows the element, BeanData, and its child elements.

```
<!ELEMENT BeanData (BeanContainer*, (StatelessBeanInstantiates |
StatefulBeanInstantiates | EntityBeanInstantiates | StatelessBeanDestroys |
StatefulBeanDestroys | EntityBeanDestroys | StatelessBeansLive |
StatefulBeansLive | EntityBeansLive | EntityBeanCreates |
StatefulBeanCreates | EntityBeanRemoves | StatefulBeanRemoves |
EntityBeanPassivates | StatefulBeanPassivates | EntityBeanActivates |
StatefulBeanActivates | BeanLoads | BeanStores | EntityBeansActive |
StatefulBeansActive | BeanMethodRT | BeanMethodCalls |
BeanMethodActive)*)>
<!ATTLIST BeanData
    %PerfObject;>
```

Each bean is deployed in a container. An element, BeanContainer, holds all of the beans as well as the aggregate of the observations over all of the beans in the container. Once again there is a series of "or" tests as the order depends upon the order of the types of beans as is discovered. FIG. 3n shows the element, BeanContainer, and its child elements. In DTD format, this is represented by:

```
<!ELEMENT BeanContainer (Bean*, (StatelessBeanInstantiates |
StatefulBeanInstantiates | EntityBeanInstantiates | StatelessBeanDestroys |
StatefulBeanDestroys | EntityBeanDestroys | StatelessBeansLive |
StatefulBeansLive | EntityBeansLive | BeanMethodRT |
BeanMethodCalls | EntityBeanCreates | StatefulBeanCreates |
EntityBeanRemoves | StatefulBeanRemoves | EntityBeanPassivates |
StatefulBeanPassivates | EntityBeanActivates | StatefulBeanActivates |
BeanLoads | BeanStores | EntityBeansActive | StatefulBeansActive |
BeanMethodRT | BeanMethodActive)*)>
<!ATTLIST BeanContainer
    %PerfObject;>
```

FIG. 3o shows the element, Bean, and its child elements. In DTD format, this is represented by:

```
<!ELEMENT Bean (BeanMethodRT, BeanMethodCalls, BeanInstantiates,
BeanDestroys, BeansLive, BeanCreates ?, BeanRemoves ?,
BeanActivates ?, BeanPassivates ?, BeansActive ?, BeanLoads ?,
BeanStores ?)>
<!ATTLIST Bean
    %PerfObject;
    type (Entity | StatelessSession | StatefulSession) #IMPLIED>
<!--The number of beans created. It applies to an individual bean that
is either stateful or entity.
-->
<!ELEMENT BeanCreates (PerfNumericInfo)*>
<!ATTLIST BeanCreates
    %PerfObject;>
<!--The number of entity beans created.
-->
<!ELEMENT EntityBeanCreates (PerfNumericInfo)*>
<!ATTLIST EntityBeanCreates
    %PerfObject;>
<!--The number of stateful beans created.
-->
<!ELEMENT StatefulBeanCreates (PerfNumericInfo)*>
<!ATTLIST StatefulBeanCreates
    %PerfObject;>
<!--The number of entity beans removed pertaining to a specific bean.
It applies to an individual bean that is either stateful or entity.
-->
<!ELEMENT BeanRemoves (PerfNumericInfo)*>
<!ATTLIST BeanRemoves
    %PerfObject;>
<!--The number of entity beans removed.
-->
<!ELEMENT EntityBeanRemoves (PerfNumericInfo)*>
<!ATTLIST EntityBeanRemoves
    %PerfObject;>
<!--The number of stateful bean removes.
-->
<!ELEMENT StatefulBeanRemoves (PerfNumericInfo)*>
<!ATTLIST StatefulBeanRemoves
    %PerfObject;>
<!--The number of bean passivates pertaining to a specific bean. It
applies to an individual bean that is either stateful or entity.
-->
<!ELEMENT BeanPassivates (PerfNumericInfo)*>
<!ATTLIST BeanPassivates
    %PerfObject;>
<!--The number of entity bean passivates.
-->
<!ELEMENT EntityBeanPassivates (PerfNumericInfo)*>
<!ATTLIST EntityBeanPassivates
    %PerfObject;>
<!--The number of stateful bean passivates.
-->
<!ELEMENT StatefulBeanPassivates (PerfNumericInfo)*>
<!ATTLIST StatefulBeanPassivates
    %PerfObject;>
<!--The number of bean activates pertaining to a specific bean.
It applies to an individual bean that is either stateful or entity.
-->
<!ELEMENT BeanActivates (PerfNumericInfo)*>
<!ATTLIST BeanActivates
    %PerfObject;>
<!--The number of entity bean activates.
-->
<!ELEMENT EntityBeanActivates (PerfNumericInfo)*>
<!ATTLIST EntityBeanActivates
    %PerfObject;>
<!--The number of stateful bean activates.
-->
<!ELEMENT StatefulBeanActivates (PerfNumericInfo)*>
<!ATTLIST StatefulBeanActivates
    %PerfObject;>
<!--Number of times the bean data was loaded. It applies to Entity.
-->
<!ELEMENT BeanLoads (PerfNumericInfo)*>
<!ATTLIST BeanLoads
    %PerfObject;>
<!--Number of times the bean data was stored in the database.
It applies to Entity.
-->
<!ELEMENT BeanStores (PerfNumericInfo)*>
<!ATTLIST BeanStores
    %PerfObject;>
<!--Number of times a bean object was created. This applies to
an individual bean regardless of its type.
-->
<!ELEMENT BeanInstantiates (PerfNumericInfo)*>
<!ATTLIST BeanInstantiates
    %PerfObject;>
<!--Number of times a stateless session bean object was created.
-->
<!ELEMENT StatelessBeanInstantiates (PerfNumericInfo)*>
<!ATTLIST StatelessBeanInstantiates
    %PerfObject;>
<!--Number of times a stateful session bean object was created.
-->
<!ELEMENT StatefulBeanInstantiates (PerfNumericInfo)*>
<!ATTLIST StatefulBeanInstantiates
    %PerfObject;>
<!--Number of times an entity bean object was created.
-->
<!ELEMENT EntityBeanInstantiates (PerfNumericInfo)*>
<!ATTLIST EntityBeanInstantiates
    %PerfObject;>
<!--Number of times an individual bean object was destroyed.
This applies to any bean regardless of its type.
-->
<!ELEMENT BeanDestroys (PerfNumericInfo)*>
<!ATTLIST BeanDestroys
    %PerfObject;>
<!--Number of times a stateless session bean object was destroyed.
-->
<!ELEMENT StatelessBeanDestroys (PerfNumericInfo)*>
<!ATTLIST StatelessBeanDestroys
    %PerfObject;>
<!--Number of times a stateful session bean object was destroyed.
-->
<!ELEMENT StateflulBeanDestroys (PerfNumericInfo)*>
<!ATTLIST StatefulBeanDestroys
    %PerfObject;>
<!--Number of times an entity bean object was destroyed.
-->
<!ELEMENT EntityBeanDestroys (PerfNumericInfo)*>
<!ATTLIST EntityBeanDestroys
    %PerfObject;>
<!--Average number of active beans instance pertaining to
a specific bean. This applies to an individual bean that is either
stateful or entity.
-->
<!ELEMENT BeansActive (PerfLoadInfo)*>
<!ATTLIST BeansActive
    %PerfObject;>
<!--Average number of active entity beans.
-->
```

```
<!ELEMENT EntityBeansActive (PerfLoadInfo)*>
<!ATTLIST EntityBeansActive
    %PerfObject;>
<!--Average number of active session beans.
-->
<!ELEMENT StatefulBeansActive (PerfLoadInfo)*>
<!ATTLIST StatefulBeansActive
    %PerfObject;>
<!--Average number bean objects of this specific type that are instantiated
but not yet destroyed. This applies to an individual bean regardless
of its type.
-->
<!ELEMENT BeansLive (PerfLoadInfo)*>
<!ATTLIST BeansLive
    %PerfObject;>
<!--Average number of stateless session bean objects that are instantiated,
but not yet destroyed.
-->
<!ELEMENT StatelessBeansLive (PerfLoadInfo)*>
<!ATTLIST StatelessBeansLive
    %PerfObject;>
<!--Average number of stateful session bean objects that are instantiated,
but not yet destroyed.
-->
<!ELEMENT StatefulBeansLive (PerfLoadInfo)*>
<!ATTLIST StatefulBeansLive
    %PerfObject;>
<!--Average number of entity bean objects that are instantiated, but not
yet destroyed.
-->
<!ELEMENT EntityBeansLive (PerfLoadInfo)*>
<!ATTLIST EntityBeansLive
    %PerfObject;>
<!--Average method response time for all methods defined in the remote
interface to this bean. This applies to all beans.
-->
<!ELEMENT BeanMethodRT (PerfStatInfo)*>
<!ATTLIST BeanMethodRT
    %PerfObject;>
<!--Average number of methods being processed concurrently. This
applies to all beans.
-->
<!ELEMENT BeanMethodActive (PerfLoadInfo)*>
<!ATTLIST BeanMethodActive
    %PerfObject;>
<!--Total number of method calls against this bean.
-->
<!ELEMENT BeanMethodCalls (PerfNumericInfo)*>
<!ATTLIST BeanMethodCalls
    %PerfObject;>
```

The Application server 108 holds a cache of bean objects. Each container has a cache and therefore there is an element, BeanObjectPoolContainer, per container. Java Beans exist in containers. The top level BeanObjectPool holds an aggregate of all of the container data. FIG. 3p shows an element, BeanObjectPool, and its child elements. In DTD format, this is represented by:

```
<!ELEMENT BeanObjectPool (BeanObjectPoolContainer*, NumGet,
NumGetFound, NumPuts, NumPutsDiscarded, NumDrains, DrainSize,
BeanPoolSize) ? >
<!ATTLIST BeanObjectPool
    %PerfObject;>
```

FIG. 3q shows the element, BeanObjectPoolContainer, and its child elements. In DTD format, this is represented by:

```
<!ELEMENT BeanObjectPoolContainer (BeanObject*, NumGet,
NumGetFound, NumPuts, NumPutsDiscarded, NumDrains, DrainSize,
BeanPoolSize)>
<!ATTLIST BeanObjectPoolContainer
    %PerfObject;>
```

FIG. 3r shows the element, BeanObject, and its child elements. In DTD format, this is represented by:

```
<!ELEMENT BeanObject (NumGet, NumGetFound, NumPuts,
NumPutsDiscarded,
NumDrains, DrainSize, BeanPoolSize)>
<!ATTLIST BeanObject
    %PerfObject;>
<!-- Number of calls retrieving an object from the pool.
-->
<!ELEMENT NumGet (PerfNumericInfo)*>
<!ATTLIST NumGet
    %PerfObject;>
<!-- Number of calls to the pool that resulted in finding an available
bean.
-->
<!ELEMENT NumGetFound (PerfNumericInfo)*>
<!ATTLIST NumGetFound
    %PerfObject;>
<!-- Number of beans that were released to the pool.
-->
<!ELEMENT NumPuts (PerfNumericInfo)*>
<!ATTLIST NumPuts
    %PerfObject;>
<!-- Number of times releasing an bean to the pool resulted in the bean
being discarded because the pool was full.
-->
<!ELEMENT NumPutsDiscarded (PerfNumericInfo)*>
<!ATTLIST NumPutsDiscarded
    %PerfObject;>
<!-- Number of times the deamon found the pool was idle and attempted
to clean it.
-->
<!ELEMENT NumDrains (PerfNumericInfo)*>
<!ATTLIST NumDrains
    %PerfObject;>
<!-- Average number of beans discarded by the deamon during a clean.
-->
<!ELEMENT DrainSize (PerfStatInfo)*>
<!ATTLIST DrainSize
    %PerfObject;>
<!-- Average number of beans in the pool.
-->
<!ELEMENT BeanPoolSize (PerfLoadInfo)*>
<!ATTLIST BeanPoolSize
    %PerfObject;>
```

FIG. 3s shows an element, OrbThreadPool, and its child elements, which indicate the resources, related to the ORB thread pool, that are in the Application server 108. In DTD format, this is represented by:

```
<!ELEMENT OrbThreadPool (ActiveThreads, TotalThreads,
PercentTimeMaxed, ThreadCreates, ThreadDestroys,
ConfiguredMaxSize)>
<!ATTLIST OrbThreadPool
    %PerfObject;>
<!-- The average of active threads in pool.
-->
<!ELEMENT ActiveThreads (PerfLoadInfo)*>
<!ATTLIST ActiveThreads
    %PerfObject;>
<!-- The average number of threads in the pool.
-->
<!ELEMENT TotalThreads (PerfLoadInfo)*>
<!ATTLIST TotalThreads
    %PerfObject;>
```

-continued

```
<!-- Average percent of the time the number of threads in the pool
reached or exceeded the desired maximum number.
-->
<!ELEMENT PercentTimeMaxed (PerfLoadInfo)*>
<!ATTLIST PercentTimeMaxed
    %PerfObject;>
<!-- The number of threads created.
-->
<!ELEMENT ThreadCreates (PerfNumericInfo)*>
<!ATTLIST ThreadCreates
    %PerfObject;>
<!-- The number of threads destroyed.
-->
<!ELEMENT ThreadDestroys (PerfNumericInfo)*>
<ATTLIST ThreadDestroys
    %PerfObject;>
<!-- The configured maximum number of pooled threads.
-->
<!ELEMENT ConfiguredMaxSize (PerfNumericInfo)*>
<!ATTLIST ConfiguredMaxSize
    %PerfObject;>
```

Referring again to FIG. 4, there are shown examples of performance data for <RuntimeResources> and <Sessions> in an XML document. The data structure for each element is as follows: it starts as <{name of element}>, then a performance sample is provided, <{sample}>, and it ends with </{name of element}>.

Returning to FIG. 2, the function of steps 212 to 216, for querying middleware 112 to obtain the performance data and for mapping and building the performance data into an XML document according to the specification of FIGS. 3 and 4, can be performed by a factory (a term in the art referring to a type of object that is used to create other objects). The factory for performance data can be abstracted to have the following interface:

```
public interface PerformanceFactory {
    /** Generate a PerfLoad observation based upon a raw performance
    counter that is specific to the middleware */
        public org.w3c.dom.Element generatePerfLoad(Object rawData);
    /** Generate a PerfNumeric observation based upon a raw
    performance counter that is specific to the middleware */
        public org.w3c.dom.Element generatePerfNumeric(Object rawData);
    /** Generate a PerfStat observation based upon a raw performance
    counter that is specific to the middleware */
        public org.w3c.dom.Element generatePerfStat(Object rawData);
    /** Generate a wrapper that can contain a specific observation.
    This wrapper will be appended to the indicated parent*/
        public org.w3c.dom.Element
    generatePerfWrapper(org.w3c.dom.Element parent,
    java.lang.String name );
```

HTTP for the purposes of this document includes HTTP secured. Alternatively, another protocol providing similar functionality can of course be used. The performance data can, alternately, be sent in a Hypertext Markup Language ("HTML") document, or in another type of file format.

The servlet 110 provides a consistent interface for performance tools to request performance data and to receive the performance data in a standard XML formatted data structure. The existing Internet communication infrastructure is thus leveraged for "publication" of performance data. At the same time, this consistency also allows performance tools to be independent of the applications being monitored such that, for example, vendors can specialize in developing the analysis part of performance monitoring systems only. Further, the code of existing monitor systems only has to be re-written once to receive performance data in this standard XML formatted data structure.

Returning to FIG. 1, the present invention may also be implemented on a first medium 126 and a second medium 128 which contains computer readable instructions and data that adapt computers to perform the operations described above for the client computer 100 and the Web server 106, respectively. The first and second medium 126, 128 may be of any type of computer readable media such as, for example, diskettes, hard disks (local or remote), compact disks (CDs), digital versatile disks (DVDs), Zip drives, and the like.

The present invention may also be implemented to leverage communication infrastructures other than the Internet such as, for example, wide area networks, local area networks, and Intranets. Further, the present invention may also be implemented using network protocols other than TCP/IP such as, for example, Asynchronous Transfer Mode, Synchronous Optical NETwork, Virtual Private Network, Ethernet, and token ring.

Although preferred embodiments of the invention have been described herein, it will be understood by those skilled in the art that variations may be made thereto without departing from the spirit of the invention or the scope of the appended claims.

What is claimed is:

1. A method for a servlet of an Application server running on a Web server to provide performance data to a performance tool running on a client computer, where the Web server and the client computer are in communication over a network using a network protocol, said method comprising:
   receiving a request for performance data from the performance tool, where the request is transported over the network;
   obtaining the performance data in a format of a proprietary system as per the request;
   formatting the performance data from the format of the proprietary system into a data structure having a standard format; and
   providing the data structure to the Web server for transport to the performance tool over the network,
   wherein the formatting of the performance data is independent of the format of the proprietary system.

2. A method of claim 1, wherein the data structure is formatted in XML.

3. A method of claim 2, wherein the request is formatted in HTTP.

4. A method of claim 3, wherein the network protocol is TCP/IP.

5. A method of claim 2, wherein the data structure has a tree topology.

6. A computer program product comprising computer program code means adapted to perform all of the steps of any of claims 1 to 5 when said program is run on a computer.

7. A computer program product as claimed in claim 6 embodied on a computer readable medium.

8. A monitoring system embedded within a computing system for providing performance data to a performance tool running on a client computer, where the computing system and the client computer are in communication over a network using a network protocol, comprising:
   a communication system to receive a request for performance data from the performance tool, where the request is transported over the network;
   a data collection system to obtain the performance data in a format of a proprietary system as per the request; and
   a processing system to format the performance data from the format of the proprietary system into a data structure having a standard format;

wherein the data structure is provided to the computing system for transport to the performance tool over the network, and wherein the processing system is configured to format the performance data independent of the format of the proprietary system.

9. A monitoring system of claim 8, wherein the data structure is formatted in XML.

10. A monitoring system of claim 9, wherein the request is formatted in HTTP.

11. A monitoring system of claim 10, wherein the network protocol is TCP/IP.

12. A monitoring system of claim 9, wherein the data structure has a tree topology.

13. An article to provide performance data of a computing system to a performance tool running on a client computer, where the computing system and the client computer are in communication over a network using a network protocol, comprising:

a computer-readable storage medium for the computing system;

means recorded on the medium for the computing system to receive a request for performance data from the performance tool, where the request is transported over the network;

means recorded on the medium to obtain the performance data in the format of a proprietary system as per the request;

means recorded on the medium to format the performance data from the format of the proprietary system into a data structure having a standard format; and means recorded on the medium to provide the data structure to the computing system for transport to the performance tool over the network, wherein the means recorded on the medium to format the performance data formats the performance data independent of the format of the proprietary system.

14. An article of claim 13, wherein the data structure is formatted in XML.

15. An article of claim 14, wherein the request is formatted in HTTP.

16. An article of claim 15, wherein the network protocol is TCP/IP.

17. An article of claim 14, wherein the data structure has a tree topology.

18. A method for a performance tool running on a client computer to retrieve performance data from a servlet of an Application server running on a Web server, where the Web server and the client computer are in communication over a network using a network protocol, said method comprising:

sending a request for performance data to the servlet, where the request is provided to the client computer for transport over the network; and receiving in a standard format a data structure containing the performance data having been formatted from a format of a proprietary system into the standard format and transported from the servlet over the network to the client computer, wherein the performance data is formatted independent of the format of the proprietary system.

19. A method of claim 18, wherein the data structure is formatted in XML.

20. A method of claim 18, wherein the request is formatted in HTTP.

21. A method of claim 20, wherein the network protocol is TCP/IP.

22. A method of claim 19, wherein the data structure has a tree topology.

23. A computer program product comprising computer program code means adapted to perform all of the steps of one of claims 18 to 22 when said program is run on a computer.

24. A computer program product as claimed in claim 23 embodied on a computer readable medium.

25. A performance tool embedded within a client computer which retrieves performance data from a servlet of a computing system, where the computing system and the performance tool are in communication over a network using a network protocol, the improvement comprising:

a processor to provide a request for performance data where the request is sent by the client computer to the computing system over the network; and to receive in a standard format a data structure containing the performance data that has been formatted from a format of a proprietary system into the standard format where the data structure is transported from the computing system to the client computer over the network, wherein the performance data is formatted independent of the format of the proprietary system.

26. A performance tool of claim 25, wherein the data structure is formatted in XML.

27. A performance tool of claim 26, wherein the request is formatted in HTTP.

28. A performance tool of claim 27, wherein the network protocol is TCP/IP.

29. A performance tool of claim 26, wherein the data structure has a tree topology.

30. An article of a performance tool for running on a client computer to retrieve performance data from a servlet of a computing system, where the computing system and the performance tool are in communication over a network using a network protocol comprising:

a computer-readable storage medium;

means recorded on the medium for providing a request for performance data to the client computer for transport to the computing system over the network; and means recorded on the medium for receiving in a standard format a data structure containing the performance data that has been formatted from a format of a proprietary system into the standard format and transported from the computing system to the client computer over the network, wherein the performance data is formatted independent of the format of the proprietary system.

31. An article of claim 30, wherein the data structure is formatted in XML.

32. A performance tool of claim 31, wherein the request is formatted in HTTP.

33. A performance tool of claim 32, wherein the network protocol is TCP/IP.

34. A performance tool of claim 31, wherein the data structure has a tree topology.

35. The method of claim 1, wherein the proprietary system includes middleware.

36. The system of claim 8, wherein the proprietary system includes middleware.

37. The article of claim 13, wherein the proprietary system includes middleware.

* * * * *